(12) United States Patent
Sabins et al.

(10) Patent No.: US 10,174,583 B2
(45) Date of Patent: Jan. 8, 2019

(54) METHOD OF PLACING SEALANT INTO AN OFFSHORE WELL TO ABANDON A PRODUCTION ZONE

(71) Applicant: CSI Technologies LLC, Houston, TX (US)

(72) Inventors: Freddie Lynn Sabins, Spring, TX (US); Larry Thomas Watters, Spring, TX (US)

(73) Assignee: CSI Technologies LLC, Houston, TX (US)

( * ) Notice: Subject to any disclaimer, the term of this patent is extended or adjusted under 35 U.S.C. 154(b) by 0 days.

(21) Appl. No.: 15/613,512

(22) Filed: Jun. 5, 2017

(65) Prior Publication Data

US 2017/0350212 A1     Dec. 7, 2017

Related U.S. Application Data

(60) Provisional application No. 62/392,607, filed on Jun. 7, 2016.

(51) Int. Cl.
    *E21B 33/13*    (2006.01)
    *C04B 26/02*    (2006.01)
    (Continued)

(52) U.S. Cl.
    CPC .............. *E21B 33/13* (2013.01); *C04B 26/02* (2013.01); *C09K 8/426* (2013.01); *C09K 8/44* (2013.01); *E21B 33/12* (2013.01); *E21B 33/138* (2013.01)

(58) Field of Classification Search
    CPC ......... E21B 33/13; E21B 33/12; C04B 26/02; C09K 8/44
    See application file for complete search history.

(56) References Cited

U.S. PATENT DOCUMENTS

2005/0241855 A1* 11/2005 Wylie ...................... C09K 8/12
                                                        175/45
2005/0269080 A1    12/2005 Cowan
(Continued)

FOREIGN PATENT DOCUMENTS

WO      2017196955 A1    11/2017

OTHER PUBLICATIONS

European Search Report in related application EP 171746837.1614 dated Oct. 20, 2017.

*Primary Examiner* — Silvana C Runyan
(74) *Attorney, Agent, or Firm* — Patterson + Sheridan, LLP

(57) ABSTRACT

A method of sealing a well includes selecting a preexisting fluid pathway between a production platform and a desired sealing location in the well to be sealed, determining, for the well to be sealed, a desired quantity of sealant having known flow qualities, to be delivered in fluid form to the well in the sealing region of the well, determining, based on the flow qualities of the sealant in fluid form and the flow qualities of the preexisting fluid pathway, the time needed to deliver the desired quantity of the sealant in fluid form to the sealing location in the well, determining, based on the time needed to deliver the desired quantity of the sealant in fluid form to the sealing location in the well, whether the sealant will maintain the fluid form, if necessary, change one or more qualities of the sealant so that the desired quantity of the sealant will reach the sealing location in the well while in the fluid form, and transport the quantity of sealant, in fluid form, through the preexisting fluid pathway between a production platform and the desired sealing location in the well to be sealed.

20 Claims, 3 Drawing Sheets

(51) Int. Cl.
*C09K 8/42* (2006.01)
*C09K 8/44* (2006.01)
*E21B 33/12* (2006.01)
*E21B 33/138* (2006.01)

(56) References Cited

U.S. PATENT DOCUMENTS

| | | | |
|---|---|---|---|
| 2008/0264637 A1* | 10/2008 | Burts | C04B 40/0666 |
| | | | 166/293 |
| 2010/0051266 A1* | 3/2010 | Roddy | E21B 33/13 |
| | | | 166/250.01 |
| 2011/0203795 A1* | 8/2011 | Murphy | C09K 8/42 |
| | | | 166/292 |
| 2011/0277996 A1 | 11/2011 | Cullick et al. | |
| 2013/0284445 A1 | 10/2013 | Hughes | |
| 2016/0108305 A1 | 4/2016 | Murphy et al. | |
| 2016/0348464 A1 | 12/2016 | Sabins et al. | |
| 2017/0044864 A1 | 2/2017 | Sabins et al. | |
| 2017/0044865 A1 | 2/2017 | Sabins et al. | |
| 2018/0038061 A1 | 2/2018 | Combs et al. | |

\* cited by examiner

METHOD OF PLACING SEALANT INTO AN OFFSHORE WELL TO ABANDON A PRODUCTION ZONE

BACKGROUND OF THE INVENTION

Field of the Invention

Embodiments of the present invention generally relate to a method of injecting a sealant into a hydrocarbon well.

Description of the Related Art

Wells used for the recovery of hydrocarbons from subsurface formations which are drilled off shore, i.e., over water, and completed with wellheads located at the sea bed are known as subsea completions or riserless completions. All deepwater wells drilled in U. S. waters today are completed with subsea completions. Over time, as the well stops producing hydrocarbons in sufficient quantities to justify continuing to maintain the well, the well may be abandoned. Additionally, wells may need to be reworked, or repaired. In both cases, sealant will be injected into the well at a desired location within the well to temporarily or permanently seal the producing region of the well from the wellhead.

Accessing these wells for such remedial or abandonment operations is difficult. Initially, access to the well must be provided, typically by removing the subsea completion hardware. Additionally, a conduit must be lowered from a floating vessel dynamically positioned in place over the well to supply the sealant from a surface vessel into the sealant placement location within the well. This is a complex, costly operation requiring not only a specialized vessel but sufficient well control equipment to establish connection from the vessel to the subsea wellhead. The vessel, once connected, must remain positioned over the well while plugging sealants are mixed and pumped into the well; an operation requiring days or weeks to complete.

An alternative abandonment method would allow access to the well through existing production lines traveling from the subsea wellhead to the fixed production facility at the water's surface. These production lines carried hydrocarbons from the wellhead to the production facility throughout the well's producing lifetime. These lines are usually large diameter, long (50,000 feet is not uncommon) and can lie in a convoluted path. After years of production, the condition of flow lines is not suitable for sealant placement due to potential for hydrocarbon residue or other deposits in the lines that can disrupt flow or contaminate the sealant.

Even if the production lines were suitable for sealant transport, Portland cement slurry, the current sealant of choice for the petroleum industry, presents several impediments to placement via flow lines. First, cement slurry exhibits significant incompatibility with hydrocarbon fluids resulting in chemical reactions therebetween. This chemical reaction can produce highly-gelled mixtures that have high viscosity and a tendency to cling to the walls of the production line, which as a result will require excessive pressure to push the Portland cement sealant through the flow path, or will block flow through restrictions in the flow path such as valves or wellheads. The incompatibility can extend the hydration reaction of the cement, i.e., hardening, producing a cement that hardens slowly and develops reduced strength or does not harden at all. In addition to potential compatibility issues with contaminants that might be present in the flow line, Portland cement slurry stability poses an obstacle to placement. The pressure drop required to force a viscous sealant fluid through the wellhead dictates that placement rates (flow rate of the Portland cement) will be low. The cement particles in a slurry flowing through large-diameter horizontal pipe at low flow rate experience low shear rate. At low shear rate, cement solids in the slurry settle out from the flow and gather along the low side of the pipe, creating a flow obstruction. This obstruction increases pump pressure even to the point that displacement, i.e., continued flow through the flow line, is not possible. The deposited solids can also impede or interrupt the travel of any mechanical device used to sweep debris from the pipe ahead of cement. Finally, cement set retardation to allow extremely long placement time (maybe as long as 48 hours pumping) while remaining fluid and pumpable at surface conditions, temperature at the sea bed, and bottom hole temperature is complicated by effects of shear and fluid flow on the cement set retardation mechanism.

SUMMARY OF THE INVENTION

The invention described herein is a method of abandoning a producing formation intersected by a deepwater well completed with subsea wellhead.

A method of sealing a well includes selecting a preexisting fluid pathway between a production platform and a desired sealing location in the well to be sealed, determining, for the well to be sealed, a desired quantity of sealant having known flow qualities, to be delivered in fluid form to the well in the sealing region of the well, determining, based on the flow qualities of the sealant in fluid form and the flow qualities of the preexisting fluid pathway, the time needed to deliver the desired quantity of the sealant in fluid form to the sealing location in the well, determining, based on the time needed to deliver the desired quantity of the sealant in fluid form to the sealing location in the well, whether the sealant will maintain the fluid form, and if necessary, change one or more qualities of the sealant so that the desired quantity of the sealant will reach the sealing location in the well while in the fluid form, and transport the quantity of sealant, in fluid form, through the preexisting fluid pathway between a production platform and the desired sealing location in the well to be sealed.

Rather than access a well to be sealed using traditional operations employing a work boat maintaining a fixed position over the well and lowering a workstring of tubing to connect to the wellhead, the invention uses existing production lines that connect the wellhead to a fixed, permanent production facility.

Herein, an epoxy resin sealant is employed that exists in both a true fluid form that can be mixed and pumped through existing lines and wellhead into the well and intersected formation, and a solid form to seal off the well and the formation after delivery thereto in the fluid form. The epoxy includes a combination of a resin, a hardener, and additives. The resin and hardener react to form a hardened epoxy material, wherein, the time before the epoxy material hardens as a result of the resin hardener reaction to the point where it is too viscous to be pumped through a conduit is predictable, and can be modified by changing the relative concentrations of, or types of, resin, hardener and other additives such as reaction accelerators.

The fluid time and set properties of the epoxy resin can be controlled and tailored to allow extended fluid times at low temperature and adequate sealant property development at formation conditions.

Spacers are used to separate resin sealant from contamination or dilution by well and pipeline fluids or debris.

Spacers can be either mechanical wiper plugs or viscous fluids.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE EMBODIMENTS

Figure 1:
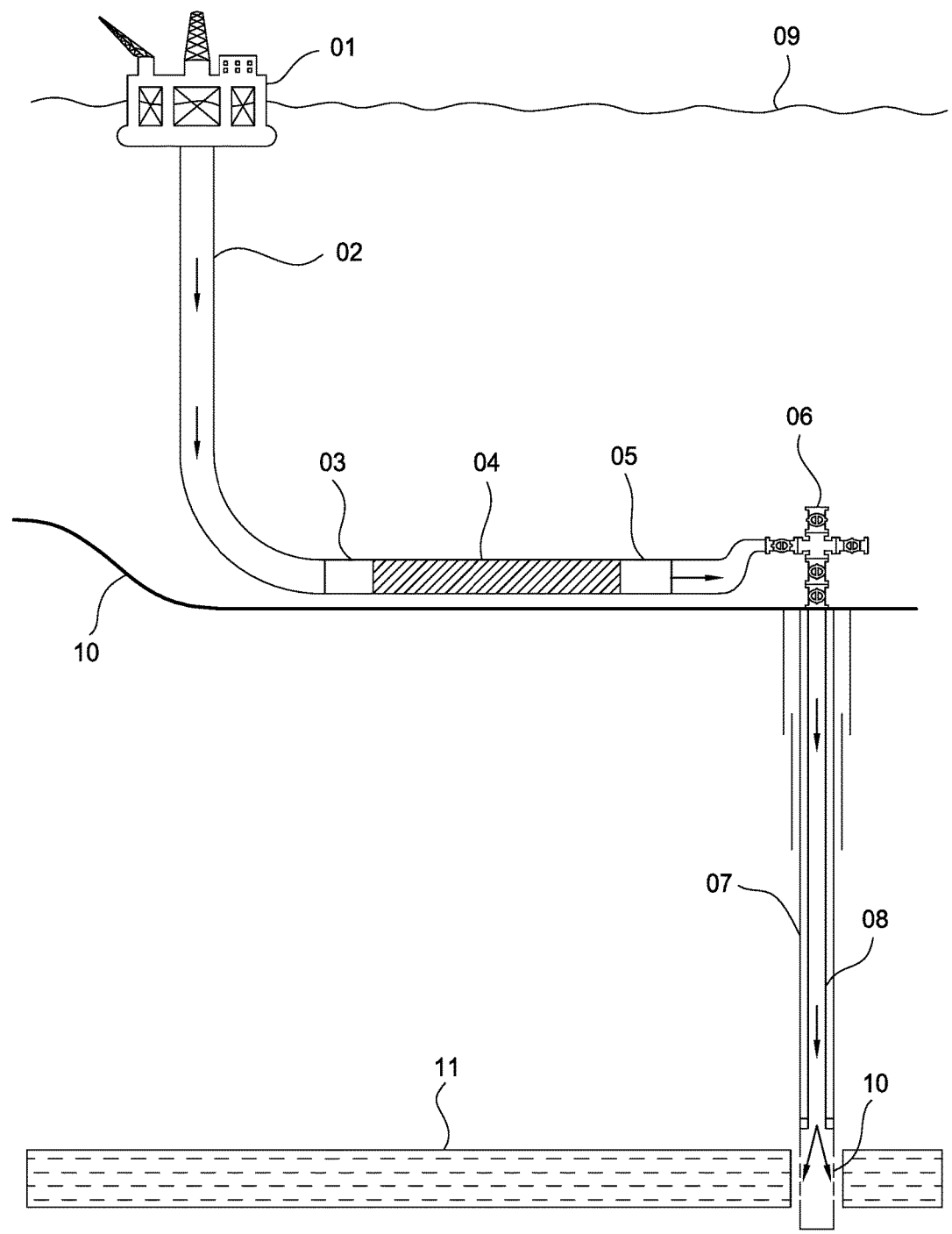
FIG. 1 schematically shows a flow of a sealant within a production line in the direction of a well.

Herein, methods and apparatus for delivering a sealant to a desired sealing location in a sub-sea well, without the need to remove the production equipment from the well head, etc., are provided. The apparatus includes a production facility 01 located at the water's surface 09 which serves the function of a central gathering system for hydrocarbons being produced from a number of wells previously drilled from the sea floor to provide a deepwater hydrocarbon production field. Each well in the field includes a wellhead 6 thereon, through which hydrocarbons produced from the well flow into a production line 02 which connects the production facility 01 to the wellhead 06, and thereby recover the produced hydrocarbons for storage or transport to a land based facility, such as through a pipeline extending therefrom to shore (not shown). Typically, the production line 2 is laid on the seafloor from the production riser at the wellhead of the well to the production platform 1, and is configured as a steel pipe having an inner diameter ranging from 2 inches to 12 inches, and a length from the wellhead 6 to the production platform 1 ranging from 2000 feet to 50,000 feet, depending on water depth and the distance of the production platform from the wellhead 06. Each production line 2 serves a single well, and is thus connected to a single wellhead 6 in the production field, and thus a number of production lines equal in number to the producing wells in the field are provided to retrieve hydrocarbons from the field. Alternatively, the production line 2 may be branched, whereby each branch connects to a different wellhead 6 in the production field. These branches may further branch to serve individual wells, and thus connect the production platform 1 with an individual wellhead 6 of the field. Each branch is valved, so that any one well and wellhead can be selectively singularly connected to the production platform 1, while the other wells and wellheads are fluidly isolated from connection through the production line 2 to the production platform 1.

Herein, the method of sealing a lower portion of a deepwater well, for example a region which was previously producing hydrocarbons in economically recoverable quantities, with a settable fluid sealant mixture using the existing production platform and the existing production lines is provided. As a result, the need to independently dive to the well head and lead a sealing material to the well head through a tubing from the sea surface is avoided. The method, illustrated and described herein, utilizes epoxy resin as the settable fluid sealing mixture to form a set, i.e., cured, seal in situ in a well location. This fluid sealing mixture includes a resin, diluent, bonding aid, defoamer, or other additives, and a hardener added in appropriate concentrations to create, after a predictable passage of time, a hardened material capable of sealing the wellbore (defined as "resin mixture"). The composition of a resin mixture formulation depends on several design parameters including the injection rate of the resulting resin mixture fluid pumped via the production line into the well, the length of the production line, the total volume of fluid displacement required to pump the resin mixture as a fluid to the well perforations, and the temperature of the wellbore. The resin mixture must be formulated to be sufficiently fluid to flow through all portions of the production line-subsea wellhead-well tubular system before setting, i.e., before hardening. The ambient temperature along this flow path can range from 36° F. at the subsea wellhead to 300-400° F. at the perforations to be sealed. Flow restrictions in the flow line 02, wellhead 06 and production tubing 08 can limit the placement rate of the fluid resin mixture 04 to as little as 20 gal/min, resulting in a total time to pump the fluid resin mixture to the sealing location to as long as 24 to 36 hours. Therefore, the fluid resin mixture viscosity must be suitably low to be mixed using standard oil field mixing equipment, flow through cold production lines without excessive pressure drop, and flow through any restricted flow paths in the wellhead.

The production line 2 lies along the seabed 10 and is cooled by the ambient sea bed and water to the sea bed temperature. Each wellhead 06 caps a single hydrocarbon well and is fluidly connected to the producing, or previously producing, formation 11 pierced by the well bore by the production tubing extending from the production formation to the seabed surface and thus the wellhead 6. This wellhead 6 provides sealing of the top of the well casing and production tubing 8 extending down the wellhead therefrom to the production formation, and thus maintains a pressure seal and is equipped with valves and connections allowing flow control and connectivity with other conduits.

The hydrocarbon well includes a borehole drilled and sealed with a series of telescoping casings 07. The portion of casing 07 adjacent to the producing formation 11 is perforated to establish a flow path for hydrocarbon recovery from the formation 11 into the interior of the casing. A production tubing 08 extends from just above the perforated section of casing to the wellhead 06 creating a sealed flow path for hydrocarbons from the producing formation 11, through the wellhead 06, and through the production line 02 to the production facility 01.

During the construction of the well, a sealing cement is located between the casing 7 and the bore hole, i.e., the earth surrounding the casing, to isolate producing regions of the well from the annulus formed between the casing and the bore hole. Likewise, where casing of different sizes form an annulus therebetween, a sealing cement is provided to form a seal between the telescoping portions of casing to prevent fluid from entering the annulus formed therebetween. Additionally, a seal such as a packer is provided between the production tubing 8 and the casing 7 which surrounds the production tubing at a location above the producing region, and a cement seal or plug is located in the casing 7 and the annulus around the casing 7 below the lowermost end of the production tubing 8 to form a seal to prevent the hydrocarbons of the formation from escaping down the interior of the casing 7 or the annulus around the casing 7 below the producing formation. Typically, when initially encountered, the hydrocarbons in the production formation are at relatively high to very high pressure, and such sealing is required to prevent undesired leakage of the hydrocarbons to the surface or being lost into the earth.

When the well is no longer sufficiently producing hydrocarbons to justify the maintenance thereof as a producing well, abandonment of the well may be required. Also, during the production of hydrocarbons from the well, the sealing cement may deteriorate and begin leaking. In either instance, sealing of the well in downhole locations must be carried out. Where the well is leaking, sealing is performed to seal the leaking location. Where the well is to be abandoned, sealing is performed to seal the production formation off from the regions of the casing and the annulus above, and if required, below the producing location.

To locate the sealant at the desired sealing location(s) in the well, the sealing resin mixture 04, which includes a resin, a hardener which reacts with the resin to form a hardenable thermosetting material, and additives is pumped into the production line 02. To isolate the sealing resin mixture 04 from any fluid and debris in the production line 2, spacers 5, 3 such as darts or plugs are provided at the forward and rear 03 fronts or ends of the quantity of resin 04 being pumped through the production line 2. Applicable spacers include mechanical plugs having circumferential seals or wipers that wipe along the production line ID and pull debris therefrom and into the location between the plug and the production line 2 location ahead of the sealant, become seated at the wellhead 06, and include a flow path therethrough which is sealed as they move through the production line but, upon being seated at the well head 6, rupture to open a flow path therethrough as a result of a difference in pressure occurring thereacross after becoming seated, to create a flow path therethrough for resin and subsequent displacement fluid to pass. Alternatively, the spacers can consist of volumes of crosslinked polymer gel. The viscoelastic gel sweeps in situ fluid and debris ahead of the resin and separates the fluids in the production line 2 from the resin preventing contamination thereof along the long placement path and during the long placement time. Being a fluid, the viscous plugs will travel through the wellhead 06 and travel down the production tubing 08 as a train with the resin 04.

Figure 2:
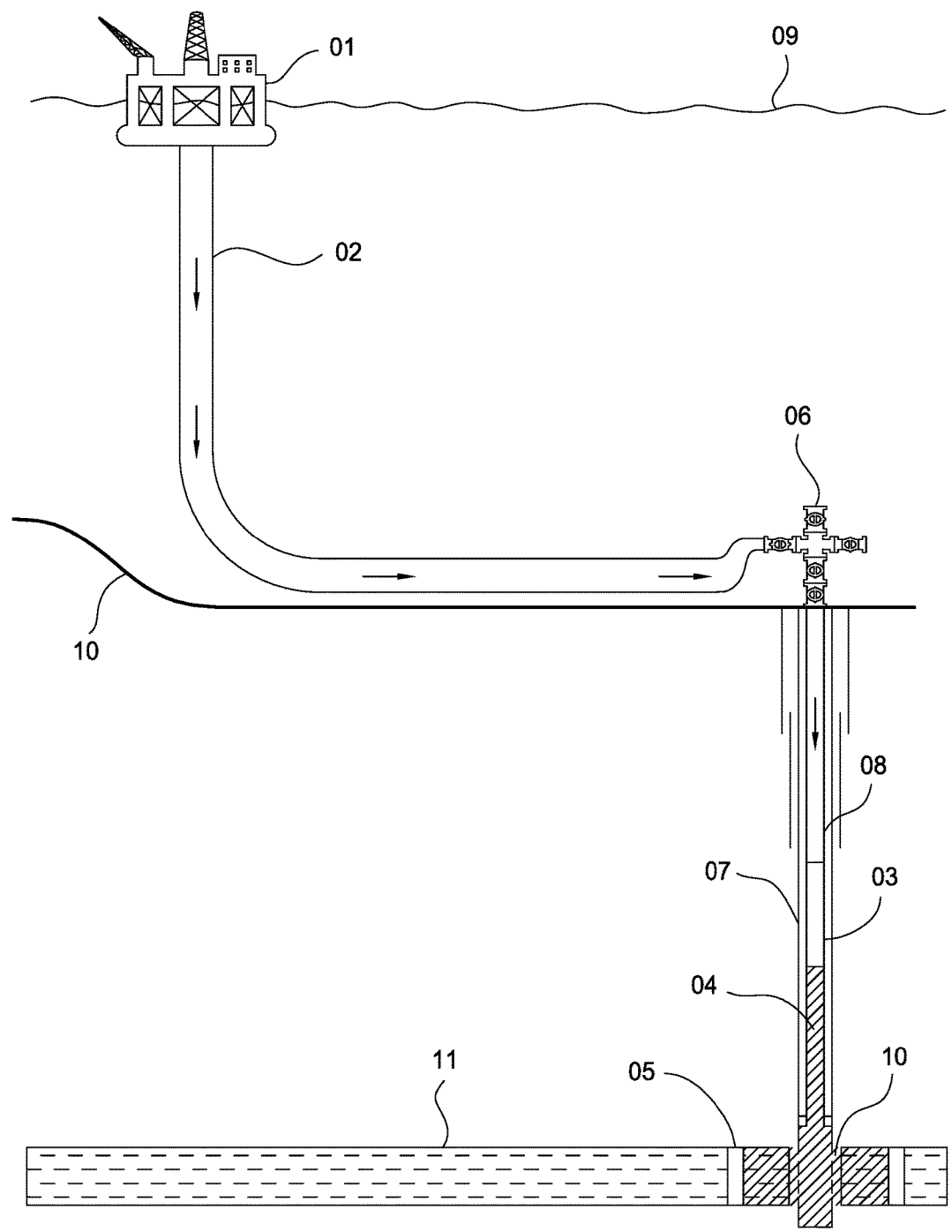
FIG. 2 schematically shows a flow of a sealant from a production line into the production tubing of a well.
Figure 3:
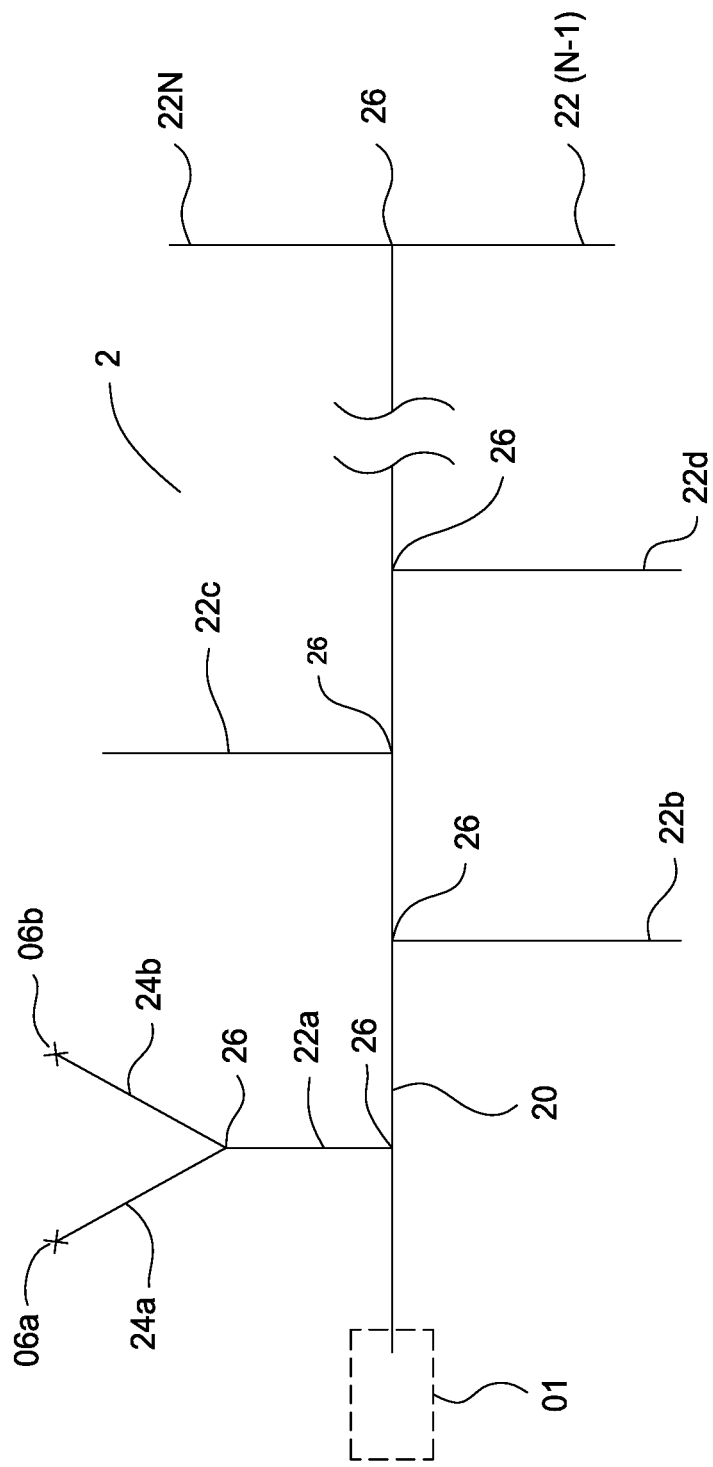
FIG. 3 schematically represents a production filed including a plurality of wells interconnected to a production facility, such as a production platform.

FIG. 01 illustrates the placement process during which the resin sealant mixture 04 is being pumped through the horizontal portion of the production line 02 and is separated from in situ fluids therein by spacers 03 and 05. FIG. 02 illustrates the final placement position of the resin sealant mixture 04 as placed according to this invention. In this illustration, the spacers 03 and 05 are viscous fluids that entered the well and traveled in a train with the resin mixture 04 to the final well bore sealing location.

Herein the components to make up the resin mixture in a fluid form are transported to the production platform 01 in separate containers and mixed via a batch mixing or a continuous mixing proportioning system. The resin mixture 04 is then pumped into the production line 02 and into the well. The fluid, including material that has collected in the production line as well as hydrocarbons present in the in the production line 02, fluid in the wellhead fluid path between the production line 02 and the production tubing 08, and fluid in the production tubing 08 (usually sea water) is forced ahead of the fluid resin mixture as it is pumped from the platform 01 and is thus forced out of the perforations 10 and thereby injected into the producing formation as the resin mixture 04 displaces it as it flows inwardly of the production line 02, wellhead 06 and then the production tubing 08.

To protect the fluid resin mixture 04 from the fluids present in the production line 02 and production tubing 08, spacers 03. 05 are located ahead and behind the fluid resin mixture 04 as it flows therethrough. These spacers 03, 05 separate the resin mixture 04 from any well fluid or debris that might contaminate or dilute the resin mixture 04. Spacers can be slugs of highly viscous fluid or mechanical wiper plugs. If mechanical wiper plugs are used, they must have rupture disks similar to a bottom cementing plug for separating cement slurry from other well fluids during cement placement. The solid plug separates fluids ahead of the solid plug from fluids behind the solid plug until the solid plug lands on a shoulder (in this case at the subsea wellhead 06) wherein the solid plug is designed to engage the shoulder and thereby form a blockage in the flow path from the production line 02 to the production tubing 08. When the solid plug is moving in front of the fluid resin mixture, or behind the fluid resin mixture and in front of a chaser fluid, the pressure across the disk is insufficient to cause the rupture disk therein to rupture. However, when the solid plug engages the shoulder of the wellhead 06, because the fluid resin mixture 04 is being pumped into the production line 02, the pressure on the production line side of the solid plug rises rapidly as compared to that on the production tubing side thereof, and the rupture disk in the top of the solid plug breaks when the pressure thus increases. This allows fluid contained behind the plug in the production line 02 to pass through the plug and into the well. If viscous fluid spacer plugs are used, they preferably comprise aqueous solutions of guar that is crosslinked to produce a highly viscosified, viscoelastic fluid. The viscous fluid has enough strength to separate and sweep the production line 02 in locations ahead of and behind the fluid resin mixture 4 as it moves through the production line, wellhead 06 and production tubing 08, collecting debris therein or moving the debris ahead of it and thereby limiting contamination of the fluid resin mixture with the debris in the production line 2. Since this spacer is a fluid, it will flow through the wellhead 06 into the well and continue to separate the resin 04 from the ambient materials as it travels down the well via the production tubing 08. The leading fluid spacer 05 will be injected into the formation ahead of the resin 04 after it passes through the perforations 10 in the well casing at the producing formation 11.

Plugging a producing formation in a well via this method proceeds as outlined below:

On the production platform 01, the mixing system is assembled and a displacement pump suitable to obtain expected fluid resin mixture flow rates and pressures is selected. The resin mixture materials and spacer materials or plugs are also selected.

The operator then determine the injection rate possible from the production platform 01 to the producing formation 11 using the production line 02, the wellhead 06, and the well tubing 08.

The operator calculates the placement time to locate all of the resin mixture 02, while in fluid form, from the production platform 01 to the producing formation 11 using the production line 02, the wellhead 06, and the well tubing 08 based on the calculated fluid resin mixture injection rate and total volume of fluid resin mixture to deliver to the sealing mixture. If the delivery time will result in hardening of the mixture before it is delivered, the resin mixture formulation is adjusted as appropriate to create a fluid resin mixture 04 that will reach the sealing location before hardening.

The first spacer 05 is then injected into the production line 02 at the platform end thereof.

The fluid resin mixture 04 is mixed, and then injected into the production line 02, thereby pushing the first spacer 05 ahead of the fluid resin mixture 04 in the production line 02.

Once the desired volume of fluid resin mixture has been injected into the production line 02, the second spacer 03 is injected into the production line 02 immediately behind the trailing edge of the fluid resin mixture 02 and thereby creates a fluid train comprised of the first spacer 05, the fluid resin mixture 02, and the second spacer 03.

The fluid train is displaced through the production line 02 with a chasing fluid, for example seawater pumped into the production line 02 directly behind the fluid train, such that the fluid resin mixture passes into the production tubing 08, and therefrom partially into the production zone 11, leaving a sufficient volume of fluid resin mixture in the well to seal the perforations and form a barrier between the formation 11 and the well tubing 08. Where a solid plug is used as the first spacer 5, the fluid being pumped into the platform 01 end of the production line under pressure ensures that the rupture disk will rupture ensuring the fluid resin mixture 04 will flow through the wellhead and into the production tubing 08.

Once the desired quantity of fluid resin mixture has been pumped into the well, the valve controlling the flow path of the fluid resin mixture and chaser fluid through the wellhead 08 is closed and the pumping of the chaser fluid is stopped, and the resin mixture 04 is allowed to harden in situ. The pressure of the chaser fluid above the fluid resin mixture at the perforated region of the keeps the fluid resin mixture in place in the well and the formation as the resin mixture hardens.

Where the production line 02 is dedicated to a particular well, i.e., the production line for the well to be sealed extends directly from the well head 06 to the platform 01 with no branches extending inwardly or outwardly thereof, the process set forth above is employed. Where the production line 02 includes a master production line 20 having a plurality of branches 22a, 22b, 22n, wherein each branch connects to an individual well, or where each branch includes further sub-branches for example sub branch 24a, 24b, each leading to an individual well head 06a, 06b respectively, an isolated flow path directly between the platform 1 and the well to be sealed, for example the well on which wellhead 06b is present, must be formed. At each branching location of master production line 20 and branches 22a-n, and at the branching location of each branch, for example branch 22a in sub-branches 24a, 24b, a valve 26 such as a three-way valve is present. The valves are selectable to allow fluid to pass from the master to a branch, or the branch to any one sub-branch, of the production line, or to seal off communication form the master to a branch or from a branch to a sub-branch. Hence, the well on which wellhead 24a is present is set in fluid communication with the platform 1 by opening the valve connecting the master production line 20 with branch 22a while closing or keeping closed the valves between the master production line and branches 22b-n, and the valve controlling communication between branch production line 22a and sub-branch 24a is set to open communication therebetween, while communication between the branch production line 22a and sub-branch 22b is closed off. Thereafter, the procedure set forth above is employed. Once the desired quantity of sealant has been injected into the formation and remains in the well bore to seal the perforations and form a sealing plug in situ, the valve connecting the branch 22a and sub-branch 24a is set to close off communication with the wellhead 06a, and the sealant is allowed to harden in situ. Because the sealant is fully delivered to the well and no portion of it remains behind in the branch 24a or the master production line 20, if remaining ones of the wells connected in the production field continue to produce, hydrocarbons can continue to be produced therefrom to the production platform after the well to be sealed is sealed.

While the foregoing is directed to embodiments of the present invention, other and further embodiments of the invention may be devised without departing from the basic scope thereof, and the scope thereof is determined by the claims that follow.

The invention claimed is:

1. A method of sealing a well penetrating a formation and in fluid communication therewith through perforations in a tubular with a sealant at a desired sealing location in the well, comprising:
   selecting a preexisting fluid pathway extending between a production platform and a desired sealing location in the well to be sealed with the sealant;
   determining, for the well to be sealed, a desired quantity of sealant having known flow qualities, to be delivered in fluid form to the sealing location of the well;
   determining, based on the flow qualities of the sealant in fluid form and the flow qualities of the preexisting fluid pathway, a time needed to deliver the desired quantity of the sealant in fluid form to the sealing location in the well;
   determining, based on the time required to deliver the desired quantity of the sealant in fluid form to the sealing location in the well, whether the sealant will maintain the fluid form until it reaches the sealing location using the preexisting fluid pathway;
   if necessary, changing one or more qualities of the sealant to a modified desired sealant composition so that the desired quantity of the modified sealant will reach the sealing location in the well while in the fluid form; and
   transporting one of the desired quantity of sealant or the modified sealant, in fluid form, through the preexisting fluid pathway between the production platform and the desired sealing location in the well to be sealed.

2. The method of claim 1, wherein the sealant is a thermoset resin and hardener mixture.

3. The method of claim 1, wherein selecting the preexisting fluid pathway between a production platform and a desired sealing location in the well to be sealed further comprises selectively setting valves to close off preexisting fluid pathways from the production platform to wells that are not desired to be sealed.

4. The method of claim 1, wherein the preexisting fluid pathway extends inwardly of a casing in a well bore.

5. The method of claim 1, wherein the preexisting pathway includes, in part, a production line configured to transport hydrocarbons from the well to be sealed to the production platform.

6. The method of claim 4, wherein the preexisting pathway includes, in part, production tubing extending from a wellhead of the well to be sealed to a perforated portion of the well.

7. The method of claim 6, wherein the production tubing extends inwardly of a casing in a well bore.

8. The method of claim 6, further comprising locating a flowable plug into the preexisting pathway at the production platform.

9. The method of claim 8, wherein the flowable plug comprises cross-linked guar.

10. The method of claim 8, further comprising injecting the sealant in fluid form into the preexisting pathway after locating the flowable plug therein.

11. The method of claim 10, further comprising pushing the flowable plug in the preexisting pathway in a direction inwardly of the well with the sealant in fluid form.

12. The method of claim 11, further comprising, after injecting the desired quantity of sealant into the preexisting fluid pathway at the production platform, flowing a chaser fluid into the preexisting fluid pathway and thereby pushing the sealant, in fluid form, into the well at the location of the perforations.

13. The method of claim 12, further comprising, before injecting the chaser fluid into the preexisting fluid pathway at the production platform, locating a second flowable plug in the preexisting fluid pathway at the production platform.

14. A method of sealing a well penetrating a formation and in fluid communication therewith through perforations in a tubular, comprising:
    selecting a preexisting fluid pathway between a production platform and a desired sealing location in the well to be sealed from a plurality of preexisting fluid pathways accessible from the production platform, wherein at least two different fluid pathways accessible from the production platform lead to two different wells;
    determining, for the well to be sealed, a desired quantity of a resin sealant capable of being transported in the preexisting fluid pathway in fluid form to the desired sealing location in the well to be sealed, and the flow qualities thereof;
    determining, based on the flow qualities of the sealant in fluid form and the flow qualities of the preexisting fluid pathway, a time needed to deliver the desired quantity of the sealant in fluid form to the desired sealing location in the well to be sealed;
    formulating the sealant whereby the time needed to deliver the sealant in fluid form is shorter than the time before the viscosity of the sealant after the ingredients of the formulation are mixed together is too long to allow it to be pumped through the preexisting fluid pathway;
    transporting the quantity of sealant, in fluid form, through the preexisting fluid pathway between the production platform and the desired sealing location in the well to be sealed.

15. The method of claim 14, wherein the preexisting fluid pathway extends inwardly of a casing in a well bore.

16. The method of claim 14, wherein the preexisting fluid pathway is selected by selectively opening or closing a valve to place a fluid pathway from the production platform in fluid communication with the selected fluid pathway.

17. The method of claim 16, further comprising:
    before transporting the sealant, introducing a barrier material into the fluid pathway from the production platform.

18. The method of claim 17, wherein the barrier material is one of cross-linked guar, a wiper plug or a dart.

19. The method of claim 14, further comprising, after injecting the desired quantity of sealant into the preexisting fluid pathway from the production platform, flowing a chaser fluid into the preexisting fluid pathway and thereby pushing the sealant, in fluid form, into the well at the location of the perforations.

20. The method of claim 19, further comprising, before injecting the chaser fluid into the preexisting fluid pathway at the production platform, locating a second barrier material in the preexisting fluid pathway from the production platform.

* * * * *